(12) United States Patent
Hikosaka

(10) Patent No.: US 11,307,366 B2
(45) Date of Patent: Apr. 19, 2022

(54) OPTICAL CONNECTOR

(71) Applicant: Yazaki Corporation, Tokyo (JP)

(72) Inventor: Tomohiro Hikosaka, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 16/994,831

(22) Filed: Aug. 17, 2020

(65) Prior Publication Data

US 2021/0063654 A1     Mar. 4, 2021

(30) Foreign Application Priority Data

Aug. 27, 2019  (JP) .............................. JP2019-154760

(51) Int. Cl.
  *G02B 6/42*      (2006.01)
  *G02B 6/38*      (2006.01)

(52) U.S. Cl.
  CPC ......... *G02B 6/4214* (2013.01); *G02B 6/3825* (2013.01); *G02B 6/3869* (2013.01)

(58) Field of Classification Search
  CPC ... G02B 6/4214; G02B 6/3825; G02B 6/3869
  USPC ......................................................... 285/93
  See application file for complete search history.

(56) References Cited

U.S. PATENT DOCUMENTS

| | | | |
|---|---|---|---|
| 8,616,787 B2 * | 12/2013 | Matsuo ................ | G02B 6/4292 385/93 |
| 2003/0007748 A1 * | 1/2003 | Ide ....................... | G02B 6/4292 385/88 |
| 2003/0091303 A1 * | 5/2003 | Kami .................... | G02B 6/4277 385/92 |
| 2003/0152336 A1 * | 8/2003 | Gurevich ............. | G02B 6/4246 385/88 |
| 2004/0028349 A1 * | 2/2004 | Nagasaka ............ | G02B 6/4292 385/88 |
| 2005/0244111 A1 * | 11/2005 | Wolf .................... | G02B 6/4214 385/93 |
| 2008/0226233 A1 * | 9/2008 | Mine .................... | G02B 6/4204 385/55 |

(Continued)

FOREIGN PATENT DOCUMENTS

| | | |
|---|---|---|
| EP | 2 148 230 A1 | 1/2010 |
| EP | 3 550 343 A1 | 10/2019 |
| JP | 2019-056895 A | 4/2019 |

*Primary Examiner* — Kaveh C Kianni
(74) *Attorney, Agent, or Firm* — Sughrue Mion, PLLC

(57) ABSTRACT

To provide an optical connector which enables suppression of crosstalk, an optical connector includes a housing, an optic transceiver and a lens body, wherein the lens body includes a light emitting side lens section configured to be interposed between a light emitting element and one optical fiber of a partner optical connector, a light receiving side lens section configured to be interposed between a light receiving element and another optical fiber of the partner optical connector, and a light receiving side lens surrounding section in an integrated manner. A light shield section is formed in the lens body, the light shield section being configured to suppress a portion of light emitted from the light emitting element which enters the light receiving element via the lens body. The light receiving side lens surrounding section is configured to be transparent at an end facing the partner optical connector.

2 Claims, 5 Drawing Sheets

(56) References Cited

U.S. PATENT DOCUMENTS

2018/0267263 A1* 9/2018 Wang .................. G02B 6/4214
2018/0269971 A1* 9/2018 Tang ..................... H04B 10/40

* cited by examiner

OPTICAL CONNECTOR

BACKGROUND OF THE INVENTION

Technical Field

The present invention relates to an optical connector with an optic transceiver (FOT: Fiber Optic Transceiver) and a lens body.

Background Art

Conventionally, a board and an optical fiber are connected via a pair of optical connectors e.g. in an automobile LAN. One of the pair of optical connectors which is a "board side optical connector" includes an optic transceiver connected to a board, a light guide element with a lens function (hereinafter referred to as a "lens body"), a housing accommodating them etc. The other of the optical connectors which is an "optical fiber side optical connector" includes ferrules, a housing accommodating the ferrules etc., the ferrules being attached to respective ends of two optical fibers for transmission and receiving.

A mating space for receiving the optical fiber side optical connector is formed in the housing for the board side optical connector. By mating the optical fiber side optical connector with the mating space, end faces of the optical fibers are oriented toward the lens body. Then, light is transferred from one optical fiber through the lens body to a light receiving element of the optic transceiver, and transferred from a light emitting element of the optic transceiver through the lens body to the other optical fiber (see e.g. Patent Document 1).

CITATION LIST

Patent Literature

Patent Document 1: JP 2019-56895 A

SUMMARY OF THE INVENTION

According to Patent Document 1 as mentioned above, there is the problem that "crosstalk" may occur in the board side optical connector in which a portion of light emitted from the light emitting element enters the light receiving element via the lens body. When the crosstalk occurs, it is not possible to transmit and/or receive a correct signal, which is undesirable.

In order to solve the above-mentioned problem, an objective of the present invention is to provide an optical connector which enables suppression of crosstalk.

An optical connector according to the present invention includes a housing, an optic transceiver with a light emitting element and a light receiving element, the optic transceiver being accommodated in the housing, and a lens body accommodated in the housing, the lens body being configured to be interposed between a partner optical connector and the optic transceiver, wherein the lens body includes a light emitting side lens section configured to be interposed between the light emitting element and one optical fiber of the partner optical connector, a light receiving side lens section configured to be interposed between the light receiving element and another optical fiber of the partner optical connector, and a light receiving side lens surrounding section with a tubular shape in an integrated manner, the light receiving side lens surrounding section surrounding the light receiving side lens section, in an integrated manner, wherein a light shield section is formed in a section of the lens body which connects the light emitting side lens section to the light receiving side lens section, and wherein an end of the light receiving side lens surrounding section facing the partner optical connector is configured to be transparent.

Since the light shield section according to the present invention is formed in the section of the lens body connecting the light emitting side lens section to the light receiving side lens section, it is possible to suppress a portion of light emitted from the light emitting element which enters the light receiving element via the lens body (crosstalk).

DETAILED DESCRIPTION OF THE PREFERRED EMBODIMENTS

An "optical connector" according to an embodiment of the present invention will be described with reference to FIGS. 1 to 6.

Figure 1:
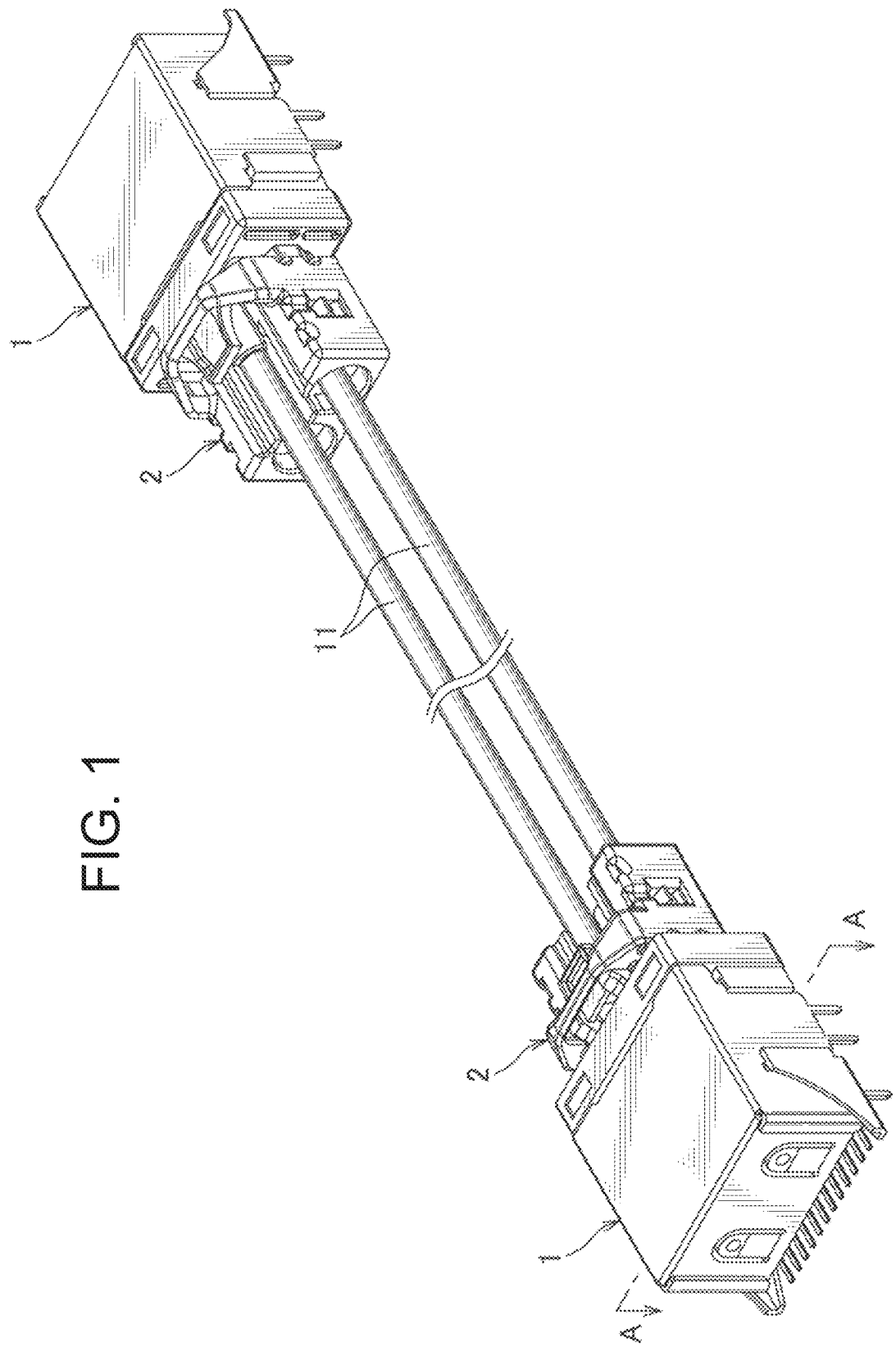
FIG. 1. shows a perspective view illustrating how an optical connector according to an embodiment of the present invention is mated with a partner optical connector.

Optical connectors 1 as shown in FIG. 1 are configured to be mounted on a board. The optical connectors 1 are configured to be mated with partner optical connectors 2 which are connected to terminal ends of optical fibers 11. In the shown example, the partner optical connectors 2 are connected to both opposite terminal ends of two optical fibers 11, each of the partner optical connectors 2 being mated with one of the optical connectors 1.

Figure 3:
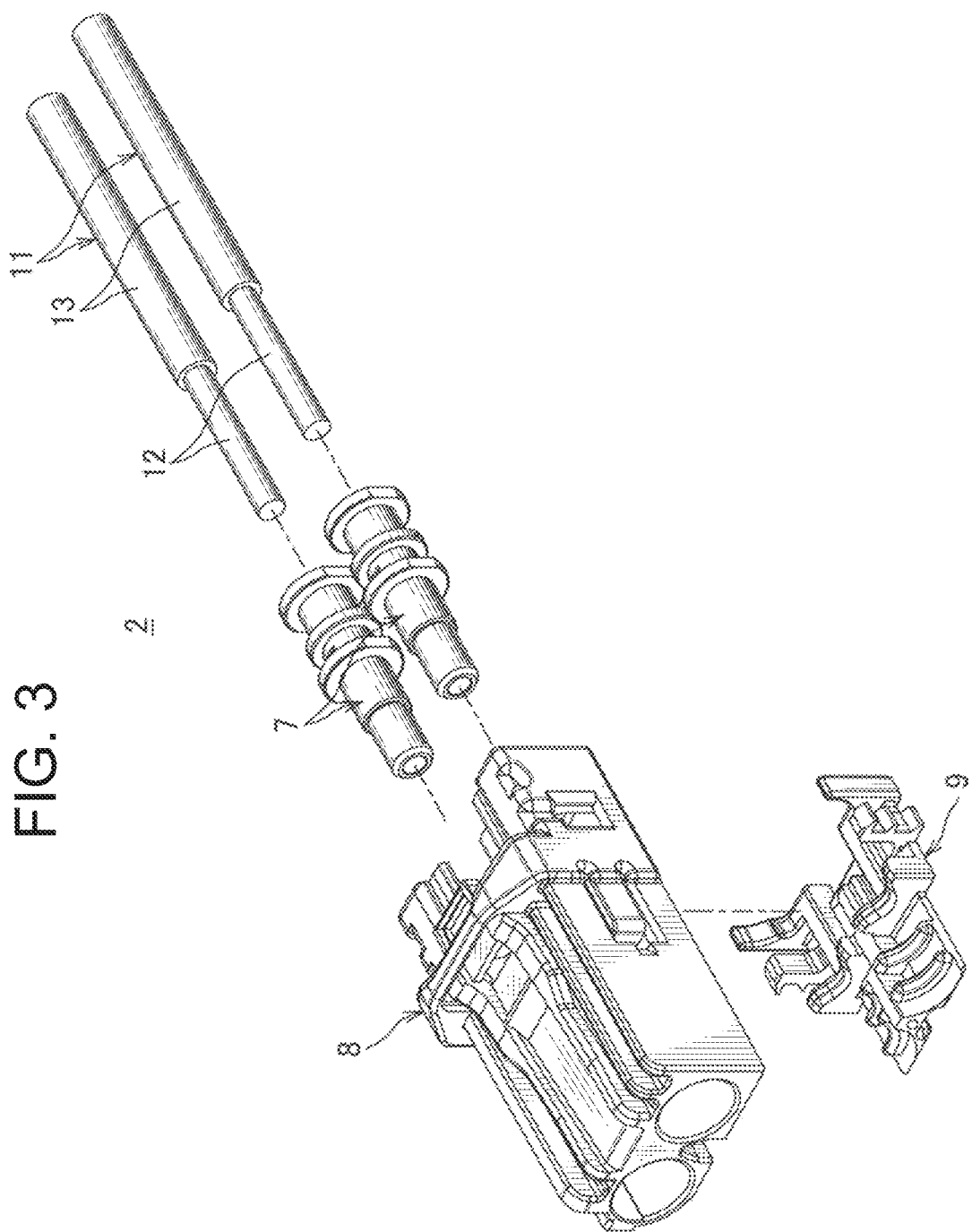
FIG. 3. shows an exploded view of a partner optical connector according to FIG. 1.

As shown in FIG. 3, the partner optical connectors 2 include ferrules 7 having a cylindrical shape, housings 8 made of resin which accommodates the ferrules 7, and holders 9 incorporated into the housing 8, the ferrules 7 being attached to respective ends of two optical fibers 11 for transmission and receiving, and the holder 9 being configured to prevent the ferrules 7 from removal.

Each of the two optical fibers 11 is formed from a bare fiber 12 and a coating 13 covering the bare fiber 12, wherein the bare fiber 12 is formed from a core and a cladding. Each of the optical fibers 11 is inserted into the ferrules 7, with the coating 13 being removed at the end of the optical fiber 11.

Figure 2:
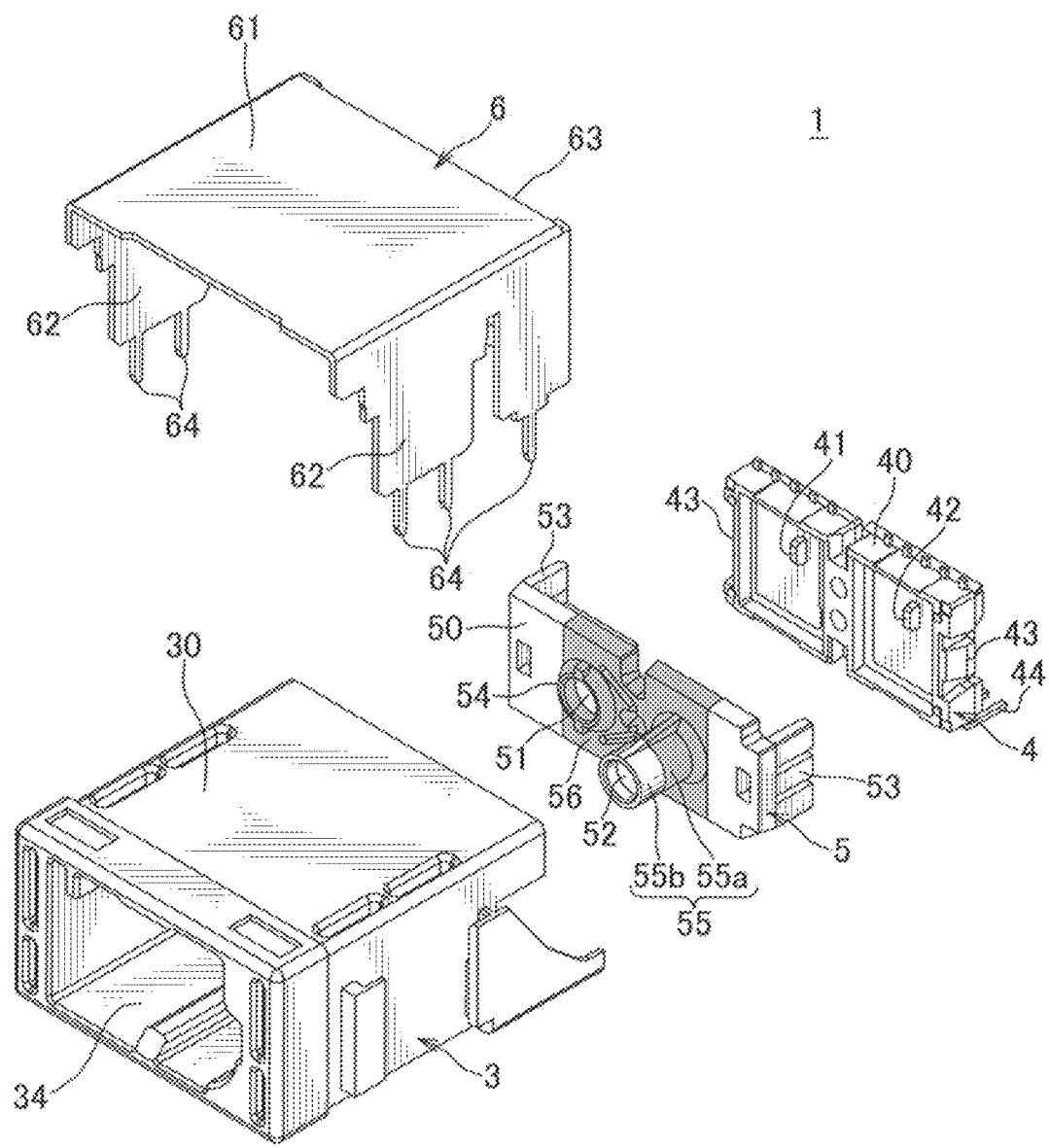
FIG. 2. shows an exploded view of the optical connector according to FIG. 1.

As shown in FIG. 2, each of the optical connectors 1 includes a housing 3 made of resin, a shield case 6, an optic transceiver (FOT: Fiber Optic Transceiver) 4 accommodated into the housing 3, and a lens body 5 accommodated into the housing 3, wherein the lens body 5 is configured to be interposed between the partner optical connector 2 and the optic transceiver 4.

Figure 4:
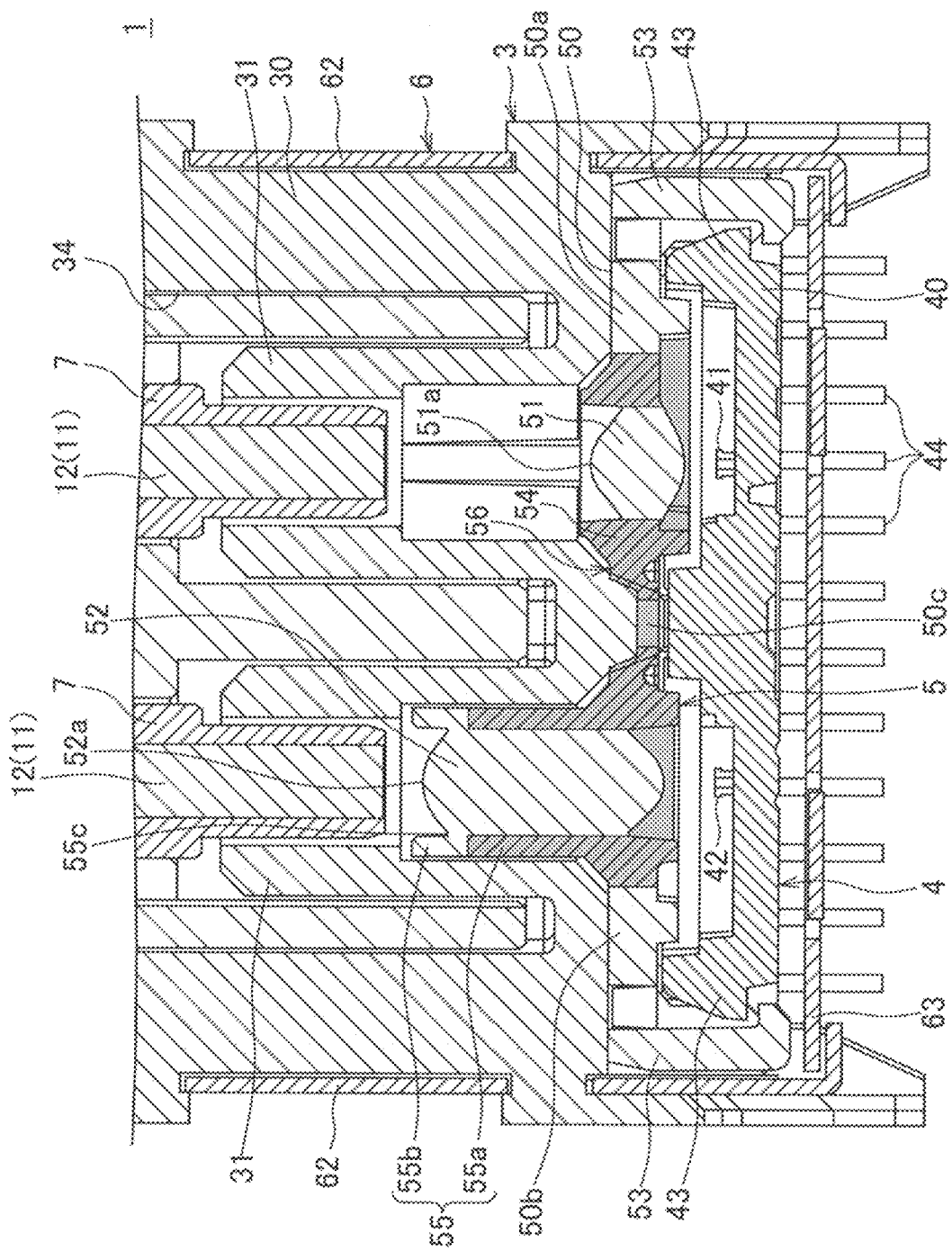
FIG. 4. shows a cross sectional view along the line A-A shown in FIG. 1.

The housing 3 includes an outer wall section 30 with a quadrilateral-tubular shape and a pair of tubular sections 31 arranged in an inside space of the outer wall section 30 in an integrated manner. As shown in FIG. 4, the tubular sections 31 in the inside space of the outer wall section 30 accommodate the lens body 5 and the optic transceiver 4 on their one side. Further, the partner optical connector 2 is mated with the tubular sections 31 in the inside space of the outer wall section 30 on their other side. The space on the other side shall be referred to as a "mating space 34".

As shown in FIG. 4, the tubular sections 31 serve for receiving and positioning the optical fibers 11 and ferrules 7 of the partner optical connector 2. The tubular sections 31 are formed in a cylindrical shape corresponding to a tip shape of the ferrules 7. The pair of tubular sections 31 are arranged in a series in a width direction of the housing 3. A central axis of each of the tubular sections 31 extends in parallel to a central axis of the outer wall section 30 (i.e. a mating direction of the partner optical connector 2).

The shield case 6 is obtained by applying e.g. a pressing process to a metal sheet. As indicated in FIG. 2, the shield case 6 includes an upper surface section 61 covering an upper surface of the outer wall section 30, a pair of side surface sections 62 covering both side surfaces of the outer wall section 30, a back surface section 63 covering the optic transceiver 4, and board connecting sections 64 extending from the respective side surface sections 62.

As shown in FIGS. 2 and 4, the optic transceiver 4 includes a light emitting element (a light emitting diode, a laser diode etc.) 41, a light receiving element (photodiode etc.) 42, a plurality of leads 44 to be connected to the board, and a holder 40 made of resin which holds them. A pair of locking projections 43 are formed at opposite ends of the holder 40, the locking projections 43 being configured to engage with the lens body 5.

Figure 5:
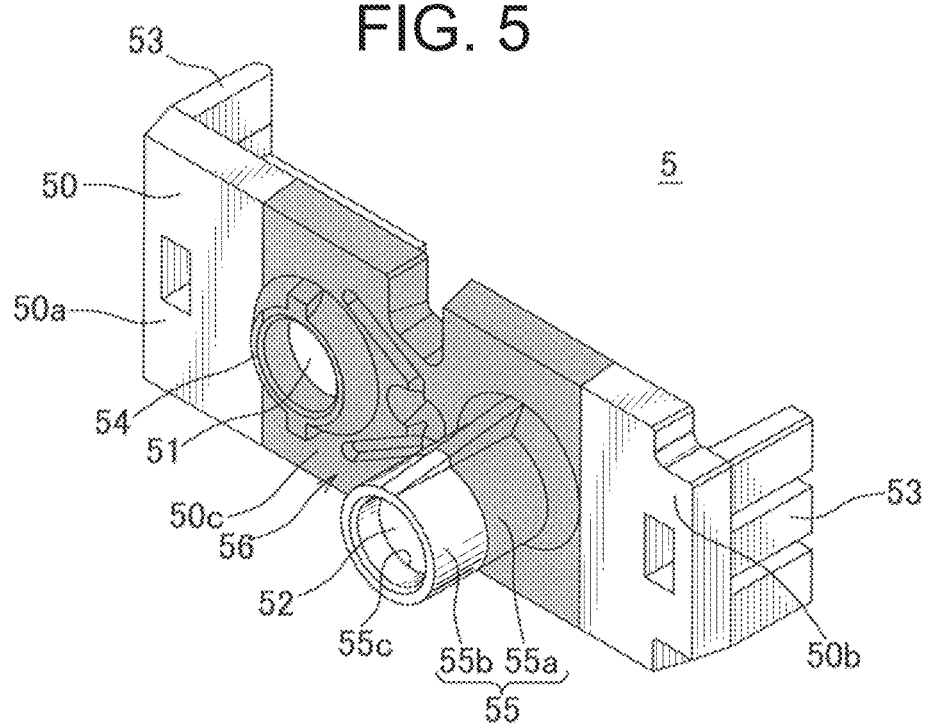
FIG. 5. shows an enlarged view of a lens body according to FIG. 2.

As shown in FIGS. 4 and 5, the lens body 5 includes a light emitting side lens section 51 configured to be interposed between the light emitting element 41 and one optical fiber 11, a light receiving side lens section 52 configured to be interposed between the light receiving element 42 and the other optical fiber 11, a light emitting side lens surrounding section 54, a light receiving side lens surrounding section 55, a plate section 50 integrated therewith, and a pair of locking arms 53 extending from both opposite ends of the plate section 50, in an integrated manner.

The light emitting side lens section 51 and light receiving side lens section 52 are configured as biconvex lenses which have convex surfaces on both sides. In the present example, the light receiving side lens section 52 is formed with a larger thickness than the light emitting side lens section 51. The light emitting side lens section 51 and light receiving side lens section 52 are formed in a circular shape when seen in their axial direction. The light emitting side lens section 51 and light receiving side lens section 52 have a larger diameter than the bare fibers 12 of the optical fibers 11.

The light emitting side lens surrounding section 54 is formed in a cylindrical shape and surrounds the light emitting side lens section 51. An outer circumference of the light emitting side lens section 51 is connected to an inner circumference of the light emitting side lens surrounding section 54. An end face of the light emitting side lens surrounding section 54 facing the partner optical connector 2 is located closer to the partner optical connector 2 than a central portion (a furthest projecting portion) of an optical fiber opposing surface 51a of the light emitting side lens section 51.

The light receiving side lens surrounding section 55 is formed in a cylindrical shape and surrounds the light receiving side lens section 52. An outer circumference of the light receiving side lens section 52 is connected to an inner circumference of the light receiving side lens surrounding section 55. An end face of the light receiving side lens surrounding section 55 facing the partner optical connector 2 is located closer to the partner optical connector 2 than a central portion (a furthest projecting portion) of an optical fiber opposing surface 52a of the light receiving side lens section 52. A location at which the light receiving side lens surrounding section 55 intersects an outer edge of the optical fiber opposing surface 52a of the light receiving side lens section 52 shall be referred to as an "intersection portion", and is designated with the reference sign 55c.

The plate section 50 is formed in a rectangular-plate shape when seen in the axial direction of the light emitting side lens section 51 and light receiving side lens section 52. The plate section 50 is connected to the outer circumferences of the light emitting side lens surrounding section 54 and light receiving side lens surrounding section 55.

The pair of locking arms 53 is engaged with the pair of locking projections 43 of the optic transceiver 4, as shown in FIG. 4. The optic transceiver 4 and the lens body 5 are assembled with each other by engaging the locking projections 43 with the locking arms 53, wherein they are incorporated into the housing 3 in such an assembled state with each other. Then, the shield case 6 is incorporated into the housing 3.

As indicated in FIG. 4, in a state where the lens body 5 is incorporated into the housing 3, the light emitting side lens section 51 and the light emitting side lens surrounding section 54 are partially located in one of the tubular sections 31, while the light receiving side lens section 52 and the light receiving side lens surrounding section 55 are substantially located in the other of the tubular sections 31.

The above-mentioned lens body 5 is obtained by means of two-component molding with a transparent resin and a black resin. In the present example, the light emitting side lens section 51, the light receiving side lens section 52, an end 55b of the light receiving side lens surrounding section 55 facing the partner optical connector 2, both opposite ends 50a and 50b of the plate section 50, and the pair of locking arms 53 are formed from transparent resin. In more details with regard to the extension of the "end 55b" of the light receiving side lens surrounding section 55, it extends from a portion of the light receiving side lens surrounding section 55 which is slightly closer to the optic transceiver 4 than the intersection portion 55c, to the end face of the light receiving side lens surrounding section 55 facing the partner optical connector 2. And the remaining portions, i.e. the light emitting side lens surrounding section 54, a portion 55a of the light receiving side lens surrounding section 55 facing the optic transceiver 4, and a central portion 50c of the plate section 50 are formed from the black resin. These portions formed from the black resin shall be referred to as "light shield section", and is designated with the reference sign 56.

Since the above-mentioned light shield section 56 includes a portion of the lens body 5 which connects the light emitting side lens section 51 to the light receiving side lens section 52, it is possible to suppress a portion of light emitted from the light emitting element 41 which enters the light receiving element 42 via the lens body 5 (crosstalk).

Although in the present example the light shield section 56 is formed with black resin, it is to be noted that it is sufficient to form the light shield section 56 according to the present invention with a material having a low transmission for a used wavelength. Further, the light shield section 56 according to the present example is formed widely extending to the periphery around the light emitting side lens section 51 and the light receiving side lens section 52, beyond the portion of the lens body 5 which connects the light emitting side lens section 51 to the light receiving side lens section 52 (a portion between the light emitting side lens section 51 and the light emitting side lens section 52), in order to prevent crosstalk with more reliability. However, it is sufficient according to the present invention to form the light shield section at least at a portion connecting the light emitting side lens section 51 to the light receiving side lens section 52. Furthermore, in the present example, both opposite ends 50a and 50b of the plate section 50 as well as the pair of locking arms 53 are formed from transparent resin. However, these portions may be formed from black resin.

Figure 6:
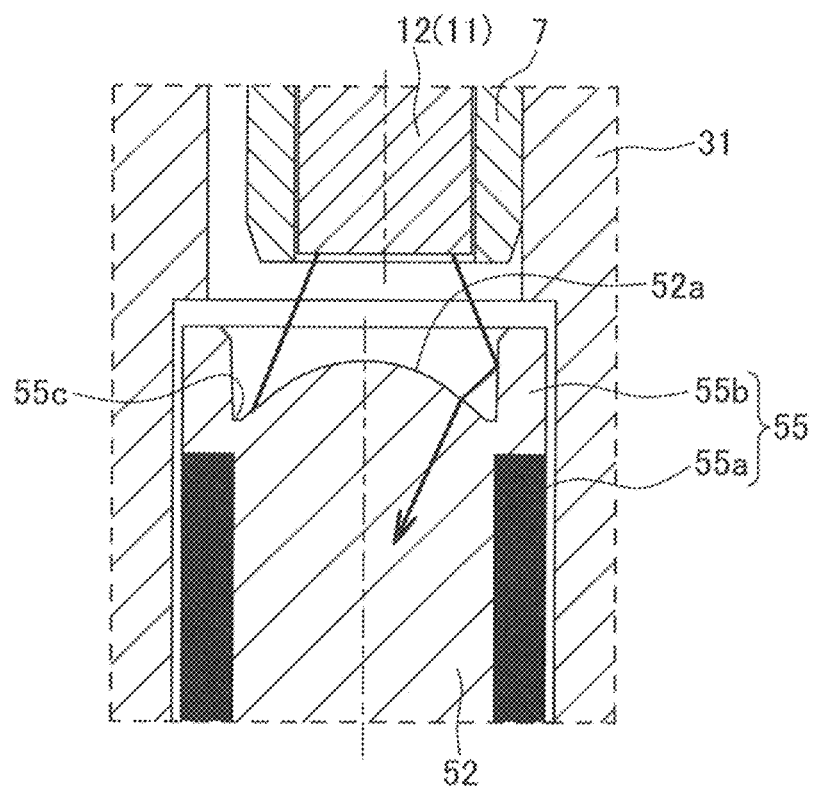
FIG. 6. is an explanation view illustrating a light travel path which may be generated in case of an axis offset between an optical fiber and a light receiving side lens section according to FIG. 4.

The end 55b of the light receiving side lens surrounding section 55 is formed from transparent resin from the following reasons: an axis offset may occur in the optical connectors 1 between an optical fiber 11 of the partner optical connector 2 and the light receiving side lens section 52 as shown in FIG. 6, e.g. due to backlash in mating with the partner optical connector 2 and/or backlash of an assembled component. In this case, a portion of light emitted from the optical fiber 11 leaks from the optical fiber opposing surface 52a of the light receiving side lens section 52, and then falls on the end 55b of the light receiving side lens surrounding section 55. If this end 55b were made of black resin, it would absorb the fallen light, which might reduce the communication reliability between the optical connectors 1 and 2.

With regard to this matter, the end 55b according to the present example is configured to be transparent, which enables that the leakage light from the optical fiber opposing surface 52a due to the above-mentioned axis offset is reflected at the end 55b to enter the optical fiber opposing surface 52a as shown in FIG. 6. Accordingly, it is possible to suppress the reduction of the communication reliability between the optical connectors 1 and 2.

In this manner, the optical connectors 1 according to the present example can suppress "crosstalk" in which a portion of light emitted from the light emitting element 41 enters the light receiving element 42 via the lens body 5, while suppressing light loss even when the axis offset occurs between the optical fibers 11 of the partner optical connectors 2 and the light receiving side lens section 52, which can suppress reduction of the communication reliability with the partner connectors 2.

It is to be noted that the embodiments as described above merely illustrate representative examples for the present invention, and the present invention is not limited to these embodiments. I.e., various modifications may be performed without departing from the core of the present invention. It is obvious that such modifications are included in the scope of the present invention as far as the modifications comprise the features of the present invention.

REFERENCE SIGNS LIST

1. Optical connectors
2. Partner optical connectors
3. Housing
4. Optic transceiver
5. Lens body
11. Optical fibers
41. Light emitting element
42. Light receiving element
51. Light emitting side lens section
52. Light receiving side lens section
54. Light emitting side lens surrounding section
55. Light receiving side lens surrounding section
56. Light shield section

What is claimed is:

1. An optical connector comprising:
   a housing;
   an optic transceiver with a light emitting element and a light receiving element, the optic transceiver being accommodated in the housing; and
   a lens body accommodated in the housing, the lens body being configured to be interposed between a partner optical connector and the optic transceiver,
   wherein the lens body includes, in an integrated manner:
   a light emitting side lens section configured to be interposed between the light emitting element and one optical fiber of the partner optical connector;
   a light receiving side lens section configured to be interposed between the light receiving element and another optical fiber of the partner optical connector; and
   a light receiving side lens surrounding section with a tubular shape, the light receiving side lens surrounding section surrounding the light receiving side lens section,
   wherein a light shield section is formed in a section of the lens body which connects the light emitting side lens section to the light receiving side lens section,
   wherein an end of the light receiving side lens surrounding section facing the partner optical connector is configured to be transparent, and
   wherein the lens body comprises a light emitting side lens surrounding section with a tubular shape which surrounds the light emitting side lens section, the light emitting side lens surrounding section being formed from black resin.

2. The optical connector according to claim 1,
   wherein the light receiving side lens surrounding section intersects an outer edge of an optical fiber opposing surface of the light receiving side lens section at an intersection portion, and
   wherein the end of the light receiving side lens surrounding section facing the partner optical connector extends from a portion of the light receiving side lens surrounding section which is slightly closer to the optic transceiver than the intersection portion, to an end face of the light receiving side lens surrounding section facing the partner optical connector.

* * * * *